United States Patent [19]

Schwarzler

[11] 3,991,782
[45] Nov. 16, 1976

[54] ATTENUATION OF A CLOSING FLAP FOR A SECONDARY AIR INTAKE OPENING IN AN AIRCRAFT ENGINE

[75] Inventor: Hans Jürgen Schwärzler, Taufkirchen, Germany

[73] Assignee: Vereinigte Flugtechnische Werke - Fokker GmbH, Bremen, Germany

[22] Filed: Feb. 17, 1976

[21] Appl. No.: 658,260

[30] Foreign Application Priority Data

Mar. 15, 1975 Germany.............................. 2511468

[52] U.S. Cl........................... 137/15.1; 239/265.17; 244/53 B; 16/84
[51] Int. Cl.².......................................... B64D 33/02
[58] Field of Search............ 244/12 B, 23 B, 42 CC, 244/42 D, 42 DA, 53 B, 53 R; 137/15.1, 15.2; 60/226 A, 230, 231; 16/66, 84; 74/519, 520; 239/265.17, 265.19, 265.29, 265.33, 265.37, 265.39

[56] References Cited
UNITED STATES PATENTS

| | | | |
|---|---|---|---|
| 634,596 | 10/1899 | Warner | 16/84 |
| 1,875,593 | 9/1932 | Hall | 244/42 D |
| 3,664,612 | 5/1972 | Skidmore | 244/53 B |
| 3,900,177 | 8/1975 | Calder et al. | 244/53 B |

Primary Examiner—George E. A. Halvosa
Assistant Examiner—Galen L. Barefoot
Attorney, Agent, or Firm—Ralf H. Siegemund

[57] ABSTRACT

The flap covering or opening a secondary air intake in an aircraft engine is linked to a shock attenuator so that movements of the flap near the closing position are strongly attenuated while movement about the fully open position is very little attenuated.

6 Claims, 6 Drawing Figures

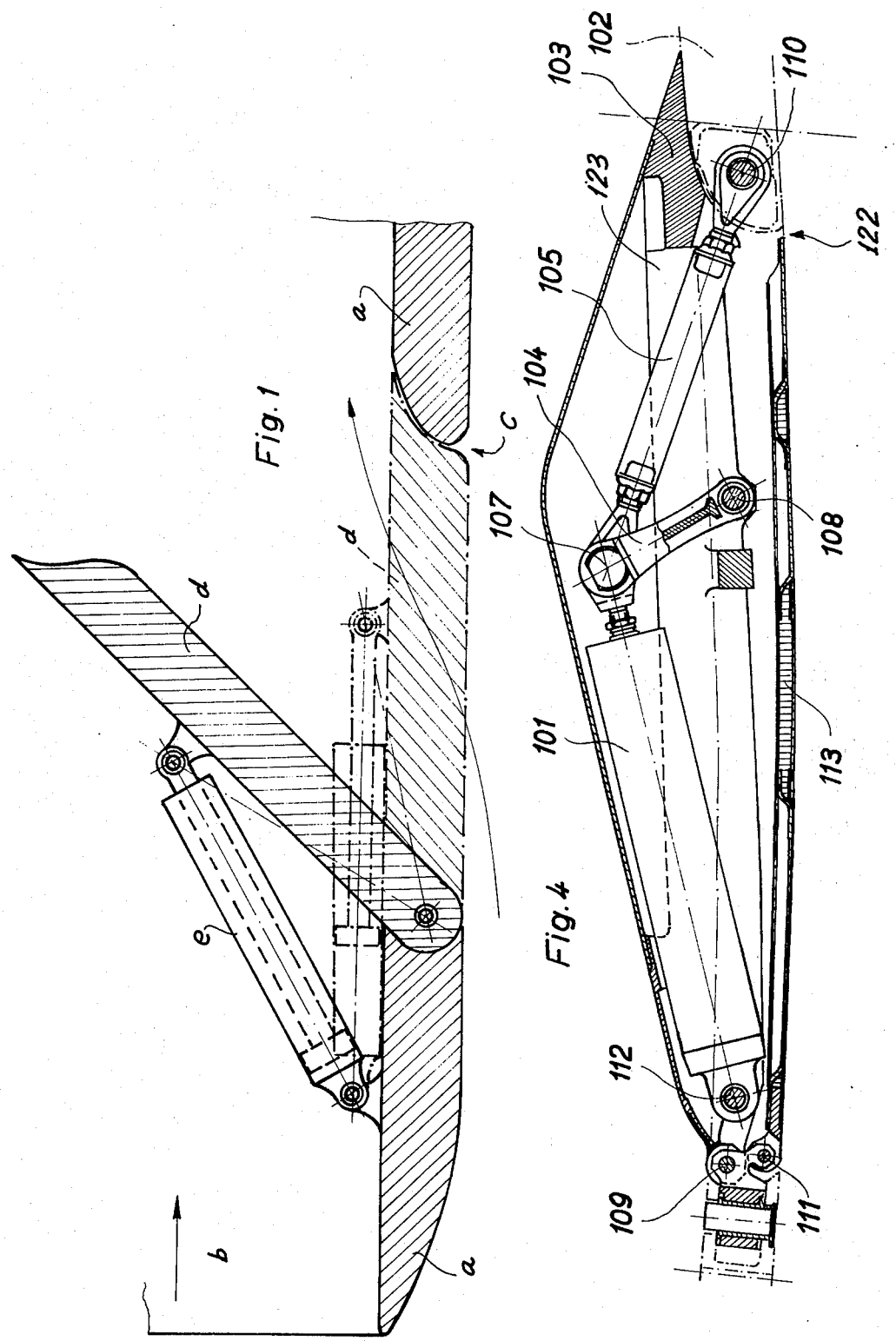

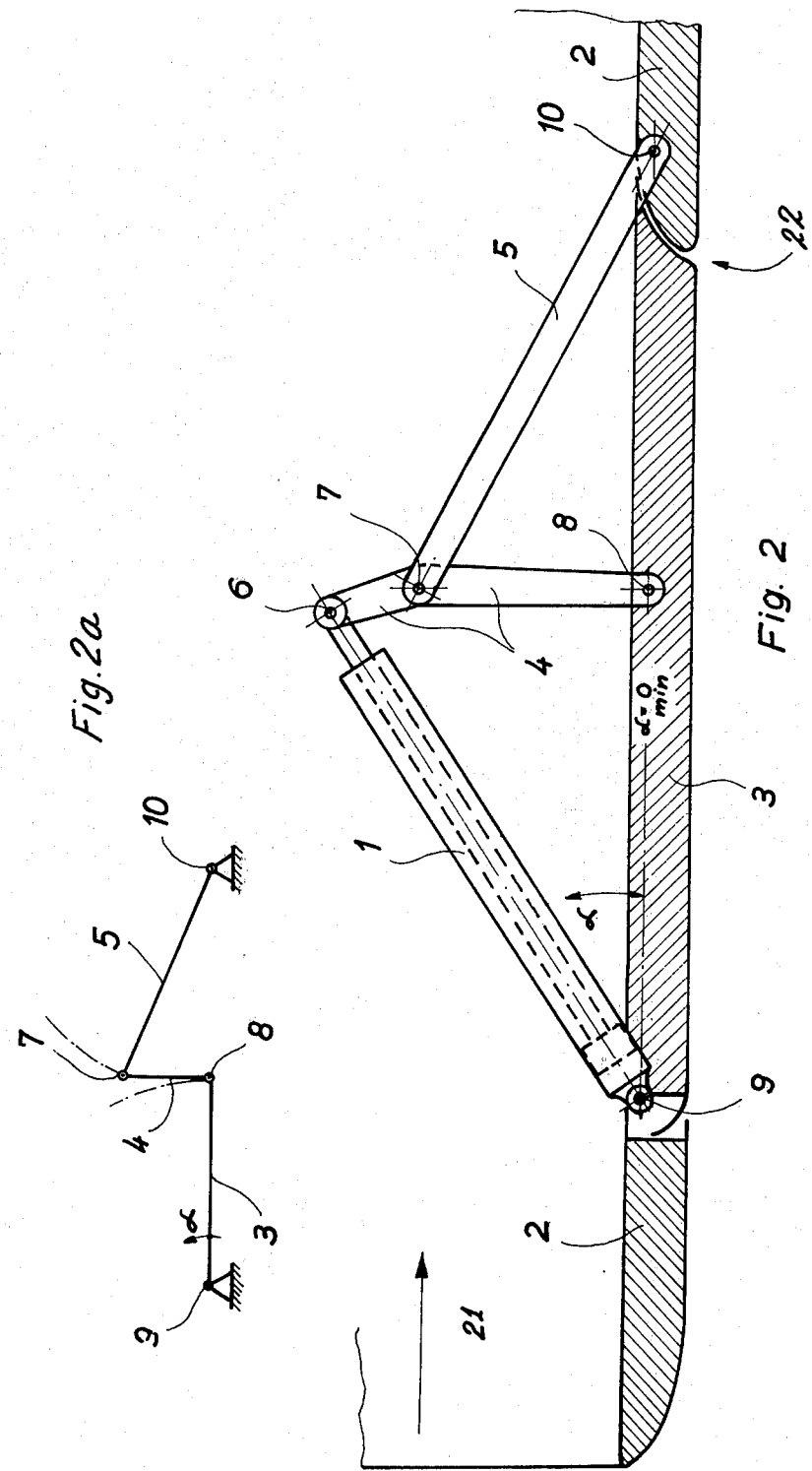

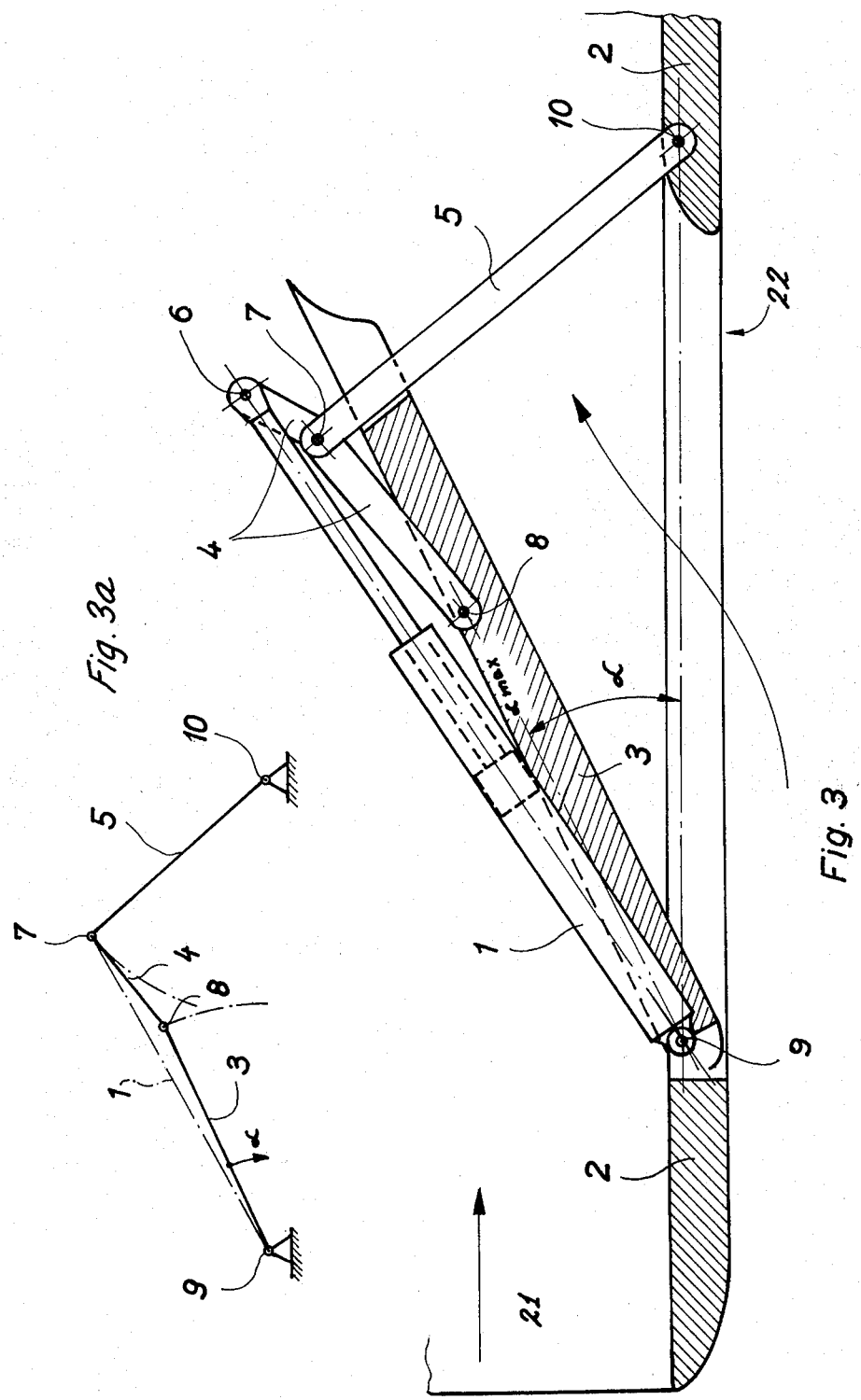

ATTENUATION OF A CLOSING FLAP FOR A SECONDARY AIR INTAKE OPENING IN AN AIRCRAFT ENGINE

BACKGROUND OF THE INVENTION

The present invention relates to the kinematics of an air-intake flap for aircraft engines and more particularly the invention relates to attenuation of unwanted movement of such a flap at a secondary air intake opening in an aircraft engine.

High speed - high performance aircrafts usually have a primary air intake for each jet engine as well as a secondary or auxiliary air intake. This secondary air intake may be established and defined by slots or an opening covered by a flap but being opened during take-off and low speed cruising. This way additional cross-sectional area is made available for the air intake.

It was found that a so-called hammershock is produced in the air intake duct of an engine of a supersonic aircraft. The hammershock is a strong pressure wave resulting from flow irregularities at the engine's compressor and propagating therefrom in the air intake duct and in upstream direction. This hammershock is not just produced during high speeds, but occurs during slow speed cruising when the secondary air intake flaps are open. Accordingly, the pressure shock waves may cause the flap to be slammed shut at such a force that the air intake structure may well be damaged. Thus, it is necessary to attenuate any accellerated movement of such a flap.

Upon considering the problem, it has to be observed, that the shock wave resulting from the hammershock is less effective for fully open than for partially open air intake. The needed attenuation of the flap movement is, therefore, dependent upon the respective flap position.

DESCRIPTION OF THE INVENTION

It is an object of the present invention to attenuate the movement of flaps at secondary air intakes of aircraft engines.

It is a particular object of the present invention to provide a flap at a secondary air intake opening with an attenuation characteristics so as to accommodate the flap to the effect of hammershocks in the air intake of the engine.

In accordance with the preferred embodiment of the invention, it is suggested to provide for a shock attenuation which is linked to the (stationary) duct wall structure as well as to the flap so that the stroke length for the attenuating device is longer (or at least not shorter) for nearly closed than for (fully) open flaps. Particularly, the one end of the shock attenuator is to be hinged close to or even right at the flap hinge, while the other end is linked through levers to the air intake duct wall structure at a location opposite the flap hinge, as well as to the flap itself, resulting in a four hinge point connection (one of which may be separated into two) which establishes the desired attenuation stroke - flap angle characteristics. Preferably, the attenuator is a hydraulic or pneumatic piston - cylinder device of the known construction, whose attenuation depends on the speed of piston displacement; the attenuation is significant for high speeds and small for low speeds of the piston in the cylinder. The device produces attenuation as the flap is being moved, and the effect of the attenuation is reflected back upon the flap to attenuate its movement very strongly when about to close the air intake opening. An attenuator that may be used is disclosed e.g. in published German patent application P 22 49 233.

The construction in accordance with the invention is of significant advantage because it accomplishes the stated objects with a minimum of parts which can be constructed to be of low weight. One does not need cam track-like guide paths or the like and there is no play between the parts so that they are effective immediately when needed.

DESCRIPTION OF THE DRAWINGS

While the specification concludes with claims particularly pointing out and distinctly claiming the subject matter, which is regarded as the invention, it is believed that the invention, the objects and features of the invention and further objects, features and advantages thereof will be better understood from the following description taken in connection with the accompanying drawings in which:

FIG. 1 is a cross-section through an air-intake flap with attenuation which, however, does not meet the necessary requirements;

FIG. 2 is a cross-section showing an example of the preferred embodiment of the invention, the flap being shown in closed position;

FIG. 2a is a diagram for illustrating the kinematics of the system of FIG. 2;

FIG. 3 is a cross-section through the same device of FIG. 2, but showing the flap in open position;

FIG. 3a is the companion diagram for FIG. 3 for illustrating the kinematics thereof; and FIG. 4 is a cross-section through a detail of a modified construction for practicing the preferred embodiment.

Proceeding now to the detailed description of the drawings, FIG. 1, as stated, illustrates how any movement of an air intake flap could be attenuated but the drawing serves to illustrate the unsolved problem. The character $a$ denotes the air intake duct for an aircraft engine wherein $b$ is the primary air intake opening and $c$ is a secondary air intake. That secondary intake opening can be closed by a flap $d$ (dash dot line) and which is shown in fully drawn lines for the open position.

The flap $d$ is connected to the piston rod of a shock attenuator with cylinder $e$ which in turn is connected to the wall structure of the air duct $a$. Upon closing the flap $d$, the piston rod is protracted from the cylinder. It can be seen that the piston rod displacement vs. flap angle characteristics is not a linear one. Specifically, for an open flap an angular flap displacement, e.g. by a unit-angle (e.g. 18) results in a considerably larger piston stroke length than a similar flap displacement will produce from a nearly closed flap position. Thus, there is very little attenuation prodided for the flap just prior to complete closing of the secondary intake. It follows that flap movements resulting from a hammershock are insufficiently attenuated by this construction.

Turning now to FIG. 2, there is again shown an air intake duct 2 for an aircraft jet engine with a primary air intake opening 21 and a secondary air intake 22. The latter duct is closeable by a flap 3. The flap 3 is hinged to the wall structure of duct 2 by means of a hinge 9. For low pressure in the duct, i.e. during takeoff and during low speed cruising, flap 3 swings inwardly thus opening the secondary opening 22 (FIG. 3). A lever or control arm 4 constituting an element of a lever means, is pivotally linked to a more central portion of flap 3. The pivot point or hinge, being denoted 8, is located slightly downstream from the flap midpoint. The control arm 4 has an upper hinge or pivot point 7 by means of which one end of a lever or rod 5 is connected to the arm 4; rod 5 is also part of the lever means. The other end of rod 5 is connected to duct wall structure at pivot or hinge point 10.

The upper end of arm 4 is pivotally linked to a piston rod 11 of a hydraulic or pneumatic shock attenuator 1; the pivot or hinge point is identified by reference numeral 6. The other end of the cylinder 1 of the shock attenuation device is pivotally linked to the same hinge point 9 of flap 3 (or at least rather closely thereto). The cylinder contains a reciprocating element (piston) with a narrow passage so that a fast displacement of the piston rod and piston in the cylinder encounters strong resistance while a slow displacement finds little resistance.

For purposes of considering the kinematics of the arrangement, the points 6 and 7 can be considered a single hinge point. Their separation amounts to the introduction of another parameter to the system which is available for better matching the system to existing conditions, for example, the maximum deflection angle for the flap. Also, off-setting hinge point 6 from hinge point 7 is an added safety feature to avoid overcenter driving. On that basis, a four point linkage is established in which 9 and 10 establish fixed pivot points and 8 and 6.7 establish movable points moving on curved paths as indicated in dash dot lines in FIGS. 2a and 3a. The separation of points 6 and 7 actually adds another hinge point.

The principal elements in the kinematic system are; the flap 3 itself, the control lever 4, and the guide rod 5. If one considers, first, FIG. 2 and 2a for a closed flap, one can see that for small angles of flap openings the pivot points 6 (7) are moved relatively far from point 9. One can see specifically from FIG. 2a that any movement of hinge point 8 on account of flap pivoting is e.g. translated into pivot motion of hinge point 7 about point 10, and that movement, in turn, is almost parallel to the permissable direction of piston rod movement in the shock attenuator. Thus, flap deflections near the closed position move the piston in the attenuating device relatively far and fast, and the motion, in turn is significantly impeded by the attenuator 1.

Conversely, for open flap (FIG. 3, 3a) a particular angular deflection of the flap produces a relatively small displacement, because points 8 and 7 move at almost right angles so that a displacement of point 8 displaces point 7 (and 6) very little, and the piston moves little and slowly. More generally, the reason for but negligible piston movement is to be seen in that the flap and the lever 4 have only a small angle relative to each other whenever the flap opens the air intake fully.

Upon generalizing these aspects one finds that with increasing distance of points 6 and 9 from each other, the relative stroke length in the attenuator per unit angle of the flap decreases. Thus, the stroke length of piston displacement for closed or nearly closed flap and per unit flap angle displacement is greater than the resulting stroke length per unit flap angle for open flap positions. The position of the attenuator cylinder 1 has no influence on the paths of the pivot points. These features produce the attenuation characteristics needed for attenuating and damping flap motion on account e.g. of hammer shocks. As the flap tends to slam shut, the flap tends to move the piston fast and far which motion is strongly impeded and attenuated thus slowing the angular falp movement and closing the secondary air intake rather gently. Conversely, for an open flap position, little attenuation is provided permitting the flap to follow resiliently but compliantly any pressure and flow changes in the air intake duct.

FIG. 4 shows structure detail of an arrangement, which is, actually, simplified along the line of merging points 6 and 7. The engine wall structure of the air intake duct is denoted here by reference numeral 102 having an opening 122 as secondary air intake. That intake can be closed by a flap structure 103 being of somewhat hollow construction. The flap 103 is pivotally linked to the duct wall structure 102 by means of a hinge 109. The flap 103 is additionally provided with an outer cover 113 which, for closed flap, continues the outer air duct contour in streamlined configuration. The cover 113 is operatively connected to flap 103, but has a separate pivot point 111. Linkage (not shown) between the two devices 103, 113 compells them to move in unison. The cover 113 is not part of the attenuation linkage.

The flap 103 has an internal support bar construction 123, having a pivot 108 for a control bar, arm or lever 104 whose other end is pivotally linked to the projecting end of a piston rod, the piston moving in a shock attenuation cylinder 101. The cylinder end is pivotally linked to the duct structure 102 by means of a hinge 112. A control and guide rod 105 has one end pivoted to hinge 107 while the other end is pivotally linked to the duct structure 102 by means of a hinge 110.

Due to the kinematic merger of the pivot points for rod 105 and the piston rod one obtains a reduced thickness or height of the flap structure. The latter projects into the flow path for the primary air intake but due to streamlined construction of flap 103 this flow is hardly interfered with. The parts 104 and 105 are of light weight and of rather simple configuration so that they can be made easily. Moreover, they are subjected essentially only to compression and tension (not or hardly to bending).

It can readily be seen that the kinematics developed above is also applicable here, though details differ. As the flap 103 pivots up from a closed position (or is about to close the secondary air intake), arm 104 pivots and displaces hinge point 107 in a direction which is almost parallel to the direction of permissible piston movement, so that maximum attenuation occurs at the point. As soon as arm 104 has pivoted to extend nearly parallel to the shock attenuator 101, the guide rod 105 extends nearly transversely to the direction of flap pivot motion as effective at point 107. Thus, any flap movement here results in very small piston displacements. Therefore, the general rule applies here; movements of the flap near the closing position tend to move the piston rod quite fast and the movement is attenuated accordingly. For an open flap movement of the latter is very little attenuated. Whenever the flap movement is translatable (via control arm 4, 104) into pivot motion of the repsective guide arm (5, 105), the shock attenuation is significant. Whenever the flap movement results, in effect, in pivoting of point 8 (or 108) of arm 4 (or 104) about the pivot 7 (or 107), the latter is moved to an insignificant degree only and little shock attenuation results.

In none of the examples described above, is it necessary to guide any pivot point in or along a supporting cam track, and there is no play (or very little) among the several parts, so that the control and shock absorbing function is available instantly when needed. The different examples above demonstrate also that the specific kinematics needed can be established on the basis of a rather wide range of parameters. The relative location of hinge points 8 and 10 (108, 110) and the lengths of the arms 4 and 5 (104, 105) are selectable, and each variation here results in a different flap angle - attenuation characteristics. The inherent non-linearity is particularly suitable for optimizing the attenuation function. As stated above, the separation of the point of linking the guide rod 5 to the control arm 4 from the linkage of the latter to the attenuation is another parameter.

The invention is not limited to the embodiments described above, but all changes and modifications thereof not constituting departures from the spirit and scope of the invention are intended to be included.

I claim:

1. In an air intake duct for aircraft engines and having a primary and a secondary air-intake opening, a construction for opening and closing the secondary air intake opening comprising:
   a flap means hinged to the duct for opening and closing the secondary opening;
   a shock attenuating device having a reciprocating element and being hinged with one end to the duct wall close to a point of hinging said flap means; and
   lever means hinged to the other end of the device and to the flap means for causing the element to reciprocate with a larger stroke length for a closing or nearly closing flap means position than for a fully open flap means position, so that the device provides for stronger attenuation of movement of the flap means when in the closing or nearly closing position than for the fully open position.

2. The construction as in claim 1, wherein the lever means includes a first lever hinged to the duct opposite the hinge of the flap means, the lever means including additionally a second lever hinged to the flap means and to the first lever, at least one of the first and second levers being hinged so said other end of the device.

3. The construction as in claim 2, wherein the fully open position is established when the point of hinging the second lever to the flap means has small but finite non-zero distance from the end points of the device.

4. The construction as in claim 2, wherein the second lever is hinged to the device, the first lever being hinged to the second lever.

5. The construction as in claim 2, wherein the first and second levers are hinged to the same point at the device.

6. The construction as in claim 1, said device being a hydraulic or pneumatic shock absorber, whose attenuating characteristics provide for higher attenuation of higher speed motion.

* * * * *